United States Patent [19]
Woods

[11] 3,986,097
[45] Oct. 12, 1976

[54] BILATERAL DIRECT CURRENT CONVERTERS

[75] Inventor: Gordon Douglas Woods, Denville, N.J.

[73] Assignee: Bell Telephone Laboratories, Incorporated, Murray Hill, N.J.

[22] Filed: June 30, 1975

[21] Appl. No.: 591,897

[52] U.S. Cl. ................................. 321/2
[51] Int. Cl.² ................................. H02M 3/28
[58] Field of Search ............... 307/64, 66; 320/5, 9, 320/57, 59; 321/2, 45 R, 44

[56] References Cited
UNITED STATES PATENTS

| | | | |
|---|---|---|---|
| 3,017,559 | 1/1962 | Mallory | 321/45 R |
| 3,044,023 | 7/1962 | Floyd | 321/45 R |
| 3,293,445 | 12/1966 | Levy | 321/45 R X |
| 3,339,080 | 8/1967 | Howald | 321/45 R X |
| 3,559,031 | 1/1971 | Vigna | 321/2 |
| 3,769,571 | 10/1973 | Wilkinson | 307/64 X |
| 3,835,364 | 9/1974 | Van Rooy | 321/2 |
| 3,873,846 | 3/1975 | Mario et al. | 320/59 X |
| 3,886,429 | 5/1975 | Maillard et al. | 321/2 |

Primary Examiner—William M. Shoop
Attorney, Agent, or Firm—R. O. Nimtz

[57] ABSTRACT

Bilateral converters are disclosed which translate direct current voltages at one level to direct current voltages at another level. The same converter can also be used to translate direct current voltages at the second level back to direct current voltages at the first level. The converter is bilateral in the sense of converting direct current energy in both directions from a higher to a lower voltage level and from the lower to the higher level.

A switching signal interrupts the direct current at the first voltage level and a transformer is used to step up or step down the voltage level. The output voltage is rectified to provide direct current power at the second voltage level. The same action takes place in the opposite direction in response to nothing more than a change in the loading placed on the system.

8 Claims, 16 Drawing Figures

BILATERAL DIRECT CURRENT CONVERTERS

BACKGROUND OF THE INVENTION

1. Field of the Invention

This invention relates to direct current conversion to different voltage levels and, more particularly, to bilateral dc-to-dc converters.

2. Description of the Prior Art

It is often desirable to power electrical systems from a remote location in order to avoid the difficulty of generating or locating a local source of electrical energy. Telephone subscriber loop systems, for example, are most advantageously powered from the telephone central office over the telephone wires to reduce the dependence of telephone service on outside power sources. The electrical resistance of the telephone wires, however, limits the amount of power which can be made available at long distances from the central office.

The power available at the remote terminals of a long telephone loop can be increased by charging a remote battery when power requirements are low and then operating from the battery for higher power demands. Voltages currently being applied to telephone pairs, however, are traditionally in the range of 130 to 270 volts while the voltage levels necessary to power semiconductor circuits are usually less than 20 volts. This suggests the need for direct current voltage level conversion in such systems.

One difficulty with powering remote electronics from a local battery is that power can be supplied only at a single remote point. If the electronics are distributed along the subscriber loop pair, high-to-low level converters must likewise be located along with the loads. Ideally, the remote battery should be at the same voltage level as the central office supply to permit direct charging and at the same time to supply power anywhere along the loop. Batteries at such high voltage levels, however, are expensive because they require a large number of cells to achieve the required voltage level.

SUMMARY OF THE INVENTION

In accordance with one embodiment of the present invention, a bilateral voltage converter is placed at a remote location on a long transmission line. The bilateral converter not only converts the high voltage on the line to a lower voltage for the purpose of charging an inexpensive battery, but the same converter also converts the low battery voltage to the higher line voltage level whenever a load on the line requires power.

A bilateral converter suitable for the system described above utilizes standard dc-to-dc converter techniques but combines two converters into a symmetrical arrangement so as to permit energy flow in either direction. The direction of energy flow depends on the actual loading of the bilateral converter. An "electronic battery" is thereby realized having the advantages of lower cost than conventional high voltage batteries and at the same time can supply power to high voltage loads.

DETAILED DESCRIPTION

Figure 1:
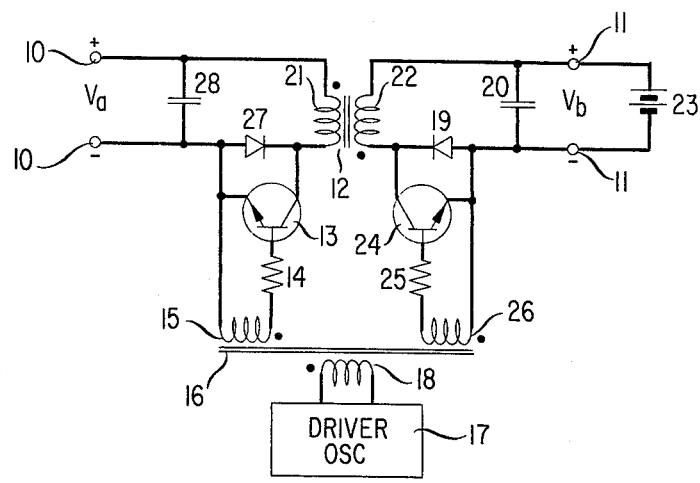
FIG. 1 is a detailed circuit diagram of a bilateral converter in accordance with the present invention utilizing energy storage techniques for the dc-to-dc conversion.

Referring more particularly to FIG. 1, there is shown a bilateral converter for converting between a high voltage $V_a$ at terminals 10 to a lower voltage $V_b$ at terminals 11 and comprising a transformer 12 having a turns ratio substantially proportional to the ratio between the two voltages $V_a$ and $V_b$. A transistor 13 on the input or high voltage side of transformer 12 serves as a chopper operated by switching signals through resistor 14 and winding 15 of transformer 16. A driver oscillator 17 of standard design is connected to primary winding 18 of transformer 16 to provide a switching signal at any desired frequency, but preferably at the frequency outside of the range of the intelligence signals which are to be operated upon by the electronic circuits to be powered from the converter of FIG. 1. In a telephone system, for example, oscillator 17 provides switching signals above the audio range and thus has no signal components which might interfere with the communications signals. Diode 19 is provided in series with the output or low voltage side of transformer 12 and serves to rectify the voltages on this side of transformer 12. The switching signal component of this rectified voltage is filtered out by capacitor 20 to provide at terminals 11 a voltage at the lower level $V_b$.

The value of voltage $V_b$ is given by the relation $$V_b = V_a N \frac{t_{on(13)}}{t_{off(13)}} \quad (1)$$

where N is the turns ratio of transformer 12, $t_{on(13)}$ is the period for which transistor 13 is turned on and $t_{off(13)}$ is the period for which transistor 13 is turned off.

The portion of the circuit of FIG. 1 described above comprises a standard energy storage type dc-to-dc converter. Transistor 13 operates between cutoff and saturation to deliver pulses of current to winding 21 of transformer 12. These current pulses induce corresponding voltages in the secondary winding 22 of transformer 12 to build up a voltage across capacitor 20. Diode 19 rectifies this voltage while capacitor 20 filters out the switching transients.

A battery 23 can be connected across terminals 11 and the voltage across capacitor 20 utilized to charge battery 23. This charging action continues as long as the current can be drawn through the winding 21 from terminals 10. This current flow is supplied from a power source connected to terminals 10 such as a central office battery at the other end of a telephone pair.

If a direct current load is connected across terminals 10, it tends to draw current through winding 21. Transistor 13 is thereby reverse-biased and remains cut off despite the signals to its base. Under this condition, however, transistor 24, in series with winding 22 of transformer 12 becomes operative and, by means of a switching signal from resistor 25 and winding 26 of transformer 16, is operated between cutoff and saturation. This switching action causes pulses of current to flow through winding 22 and introduces corresponding but higher voltage pulses in winding 21. These pulses are rectified by diode 27 and deposit a charge on capacitor 28. Under these conditions, current can be delivered to the load connected to terminals 10 and energy is transferred from battery 23 to this load. Diode 19 remains reversed biased in this mode and is not operative in the circuit.

The value of the voltage $V_a$ is given by the relation $$V_a = V_b \cdot \frac{1}{N} \cdot \frac{t_{on(24)}}{t_{off(24)}} \quad (2)$$

where N is the turns ratio of transformer 12, $t_{on(24)}$ is the period for which transistor 24 is turned on and $t_{off(24)}$ is the period for which transistor 24 is turned off. By operating transistors 13 and 24 from the source 17 but with opposite phases $$t_{on(13)} = t_{off(24)} \text{ and}$$

$$t_{off(13)} = t_{on(24)} \quad (3)$$

and the desired voltage relationships are maintained.

It can be seen that the bilateral converter of FIG. 1 operates automatically to convert energy from the high to the low voltage level or from the low to the high voltage level in response to the load presented at terminals 10. If a telephone line is connected to terminals 10, a load can be placed anywhere along the telephone line and still be supplied from battery 23. On the other hand, a low voltage load can be placed across terminals 11 and be supplied from battery 23 in accordance with well-known and conventional practice. The bilateral converter of FIG. 1 can therefore be used in the same manner as a conventional converter to supply low voltage loads at a single remote location and at the same time can be used to supply high voltage loads at any point along the transmission line.

The bilateral converter of FIG. 1 is of the so-called "energy storage" type in which the reactance of transformer 12 serves as a storage mechanism for energy between current pulses. This form of converter is illustrated in FIG. 1 only because of the relative simplicity of this type of converter from a circuit viewpoint. The principles of the present invention can just as readily be applied to other types of dc-to-dc converters in a straightforward fashion. It is only necessary to insure that the circuit arrangements are complementary on both sides of the converter and that the turns ratio or other voltage converting mechanism accommodates an appropriate ac voltage level conversion. Another bilateral converter using the so-called switching type dc-to-dc conversion is illustrated in FIG. 2.

Figure 2:
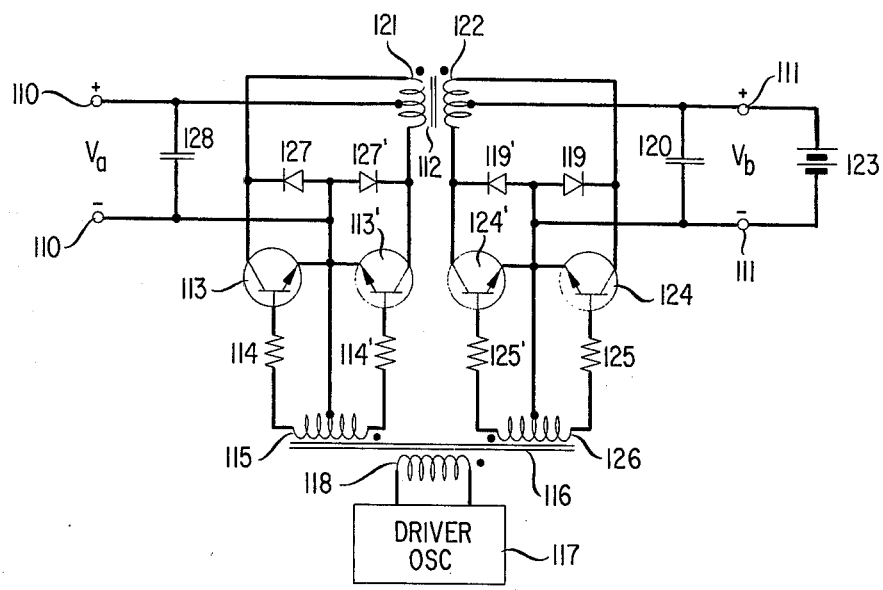
FIG. 2 is a bilateral converter in accordance with the present invention utilizing balanced push-pull switching type inverters for the dc-to-dc conversion.

Referring more particularly to FIG. 2, there is shown a bilateral converter including transformer 112 having a center-tapped high voltage winding 121 and a center-tapped low voltage winding 122. A pair of switching transistors 113 and 113' are connected in a push-pull configuration with their collector electrodes connected to opposite ends of winding 121. High frequency switching signals are coupled from center-tapped winding 115 of transformer 116 through resistors 114 and 114' to the respective bases of transistors 113 and 113'. High frequency pulses from driver oscillator 117 are supplied to winding 118 of transformer 116 to drive transistors 113 and 113' alternately into cutoff and into saturation.

Due to the center-tapped arrangements, transistors 113 and 113' are turned on alternately, one being on while the other is cut off. Current is delivered from the upper one of terminals 110 through the center tap of winding 121 and alternately through transistors 113 and 113' to the lower one of terminals 110. These current pulses through winding 121 induce voltages across winding 122 at a lower voltage level (due to the turns ratio) which are rectified by diodes 119 and 119', respectively, and delivered as a dc voltage to terminals 111. Capacitor 120 serves to filter out the switching components in this voltage. As before, a battery 123 can be connected across terminals 111 to be charged by the voltage supplied at terminals 110. The voltage relationships are the same as shown in equations (1) and (2).

A direct circuit load placed across terminals 110 draws current through winding 121 in such a direction as to cut off transistors 113 and 113'. Currents induced in winding 122 permit transistors 124 and 124' to be turned on by signals through resistors 125 and 125' and winding 126 of transformer 116. Pulses of current are delivered from battery 123 through winding 122. The voltage thereby induced in winding 121 is rectified by diodes 127 and 127' to provide a voltage across capacitor 128. Capacitor 108 filters out the switching frequencies.

As before, low voltage loads can be placed across terminals 111 to be powered from battery 123 or, in the absence of battery 123, from remotely supplied energy at terminals 110. On the other hand, high voltage loads connected across terminals 110 can also be supplied from battery 123.

The bilateral converters of FIGS. 1 or 2 are merely illustrative of the type of circuits in accordance with the present invention that serve to bilaterally convert direct current energy between two voltage levels. Other types of dc-to-dc converters can be modified in a similar manner in accordance with the teachings of this invention to provide the same result, as will be seen in the remainder of the figures. Moreover, standard voltage regulation techniques can be used to maintain the output voltage at precisely controlled values.

It should be noted that, from the viewpoint of terminals 110, the circuits of FIGS. 1 and 2 both appear to be batteries having terminal voltages at the higher voltage level. These "electronic batteries" operate much like conventional batteries in that they can be used to power high voltage loads and they can be charged from conventional charging sources. On the other hand, only relatively inexpensive electronic components and an inexpensive low voltage battery are required to realize these bilateral converters. These high voltage electronic batteries can therefore be realized at lower cost than a conventional high voltage battery.

Driver oscillators 17 and 117 may be inexpensive circuits since the frequency value is relatively unimportant and since frequency stability is not critical. This oscillator may be realized in integrated circuit form to further reduce the cost and size of the bilateral converter.

As previously noted, more standard configurations of dc-to-dc converters can be made bilateral simply by arranging the input and output halves of the converter to be symmetrical, or at least complementary. The balance of the figures in the drawings disclose some of the possible arrangements of bilateral dc-to-dc converters embodying the principles of the present invention.

Figure 3:
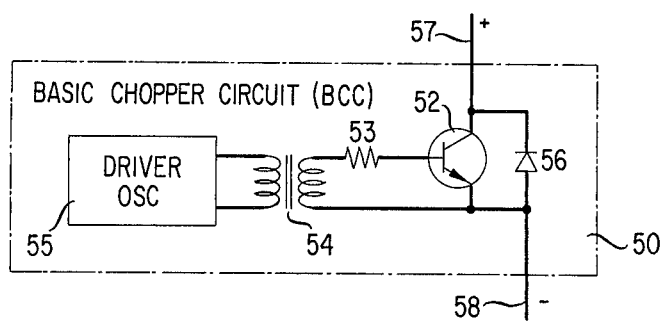
FIG. 3 is one form of a basic chopper circuit useful in realizing various embodiments of the present invention using a n-p-n transistor.
Figure 4:
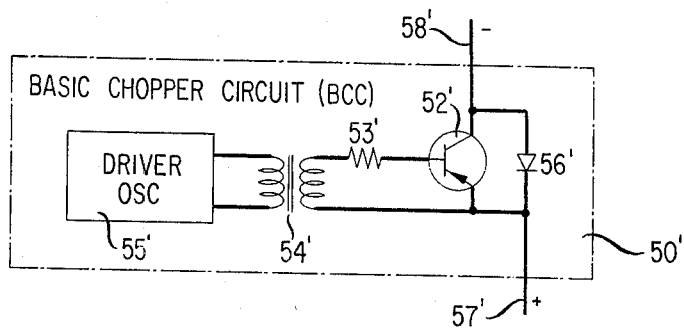
FIG. 4 is another form of a basic chopper circuit useful in realizing various embodiments of the present invention using a p-n-p transistor.

In FIGS. 3 and 4 there are shown what might be called basic chopper circuits 50 and 51. These chopper circuits form basic subunits of the bilateral converters to be described in connection with FIGS. 5 through 16. Basic chopper circuit 50 in FIG. 3 comprises a n-p-n transistor 52 having its base electrode connected through resistor 53 and transformer 54 to a source 55 of driving pulses to switch transistor 52 between saturation and cutoff. A diode 56 is connected across and poled oppositely to the collector-emitter path of transistor 52.

The chopper circuit of FIG. 3 operates to interrupt direct current flow between the upper lead 57 and the lower lead 58 under the control of driver oscillator 55. The circuit of FIG. 3 also operates as a rectifier for direct currents flowing in a direction from lead 58 to lead 57 by virtue of diode 56.

The basic chopper circuit of FIG. 4 is identical to that of FIG. 3, except that transistor 52' is a p-n-p transistor and hence the voltage relationships and the polarity of diode 56' have been reversed.

The basic chopper circuits of FIGS. 3 and 4 can be used interchangeably in the circuit configurations of FIGS. 5 through 16. It is necessary, of course, to insure that the basic chopper circuits (BCC's) are poled correctly. It is also necessary that the transistor switches 52 and 52' be turned on during appropriate halves of the switching cycle. These switching sequences will be apparent from the descriptions of FIGS. 5 through 16 and are easily obtained by driving all of the chopper circuits by the same driving oscillator.

In the circuits of FIGS. 5 through 16, the filter capacitors at the input and output terminals have been omitted for simplicity. It is clear that these could in fact, be omitted in some applications where voltage regulation is not important, or could be replaced with complex regulators as required by the expected loads.

Figure 5:
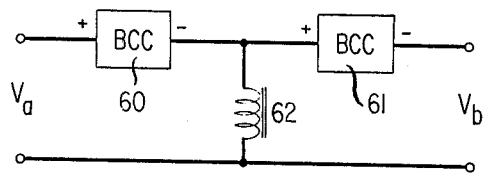
FIG. 5 is a block diagram of another form of energy storage bilateral converter using basic chopper circuits in the series arms of a T-network having an inductor element in the shunt arm.

In FIG. 5 then there is shown a block diagram of an energy storage type bilateral converter using basic chopper circuits 60 and 61 as the series arms of a T-network having inductor 62 as the shunt arm. For energy flow from left to right, circuit 60 supplies energy to inductor 62 on one-half cycle and direct current energy is delivered to the output terminals at $V_a$ through basic chopper circuit 61 on the negative half of the cycle. The ratio $V_a$ to $V_b$ is given simply by the ratio of the ON times of the transistors in circuits 60 and 61.

Figure 6:
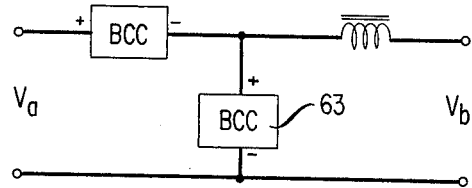
FIG. 6 is a block diagram of a T-network bilateral converter using basic chopper circuits in the input series arm and the shunt arm.

In FIG. 6 there is shown another T-network bilateral converter in which the shunt arm comprises a basic chopper circuit 63. The circuit operates similarly to that of FIG. 5, except that the shunt switching occurs rather than series switching to provide a return path for current on alternate half cycles.

Figure 7:
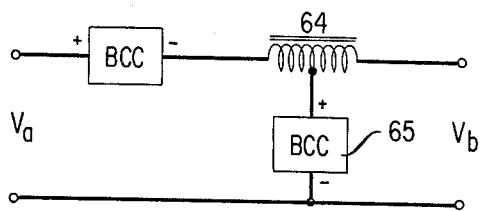
FIG. 7 is a block diagram of a T-network bilateral converter using basic chopper circuits in the input series arm and the shunt arm which is connected to form an autotransformer out of the inductive element.

In FIG. 7 yet another form of T-network bilateral converter is shown. In FIG. 7 the inductor 64 is connected to basic chopper circuit 65 in an autotransformer connection to permit autotransformer action to assist in the voltage level conversion.

Figure 8:
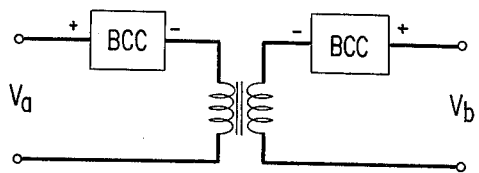
FIG. 8 is a block diagram of an energy storage bilateral converter using a transformer and corresponding to FIG. 1 of the drawings.
Figure 9:
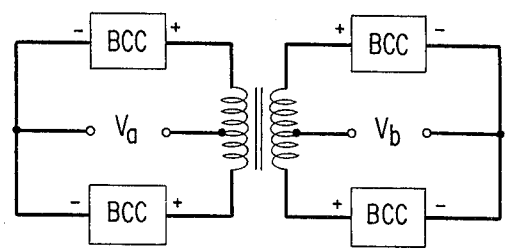
FIG. 9 is a block diagram of a push-pull type bilateral converter and corresponding to FIG. 2 of the drawings.

In FIG. 8 there is shown a simple single-ended transformer coupled bilateral converter corresponding directly to the converter of FIG. 1. Similarly, in FIG. 9 there is shown a push-pull type of bilateral converter corresponding to the converter of FIG. 2 of the drawings. These are shown again here simply for purposes of comparison. Other transformer-coupled converter configurations are shown in FIGS. 10 through 16.

Figure 10:
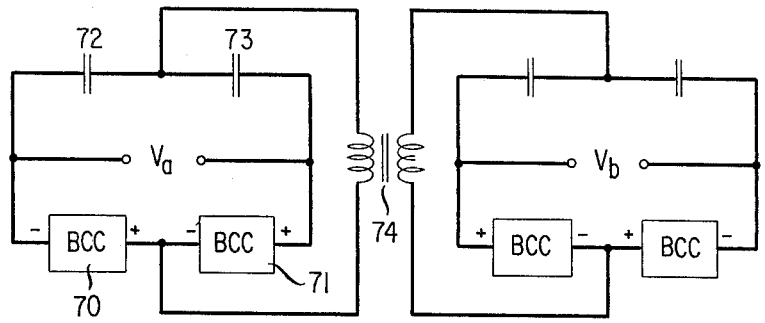
FIG. 10 is a block diagram of a half-bridge type bilateral converter.

FIG. 10 the bilateral converter takes the form of half-bridge circuits in which basic chopper circuits 70 and 71 form adjacent arms of a bridge, the opposite arms of which are formed by capacitors 72 and 73. A similar half-bridge configuration is provided connected to the other winding of transformer 74 to provide bilateral capability.

Figure 11:
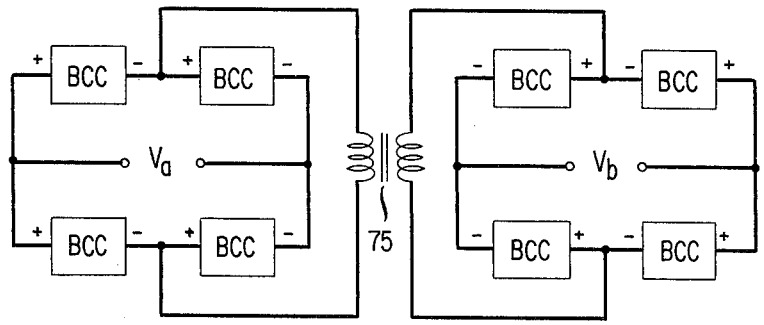
FIG. 11 is a block diagram of a full-bridge type bilateral converter.

In FIG. 11 there is shown a full-bridge bilateral converter in which basic chopper circuits form all four arms of the bridge circuit on both the input and output windings of transformer 75.

Figure 12:
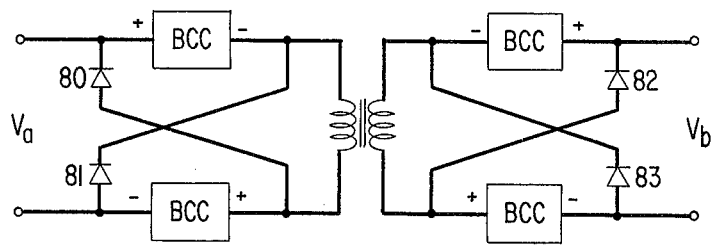
FIG. 12 is a block diagram of a double-ended transformer coupled bilateral converter with diode cross-coupling.

In FIG. 12 there is shown a double-ended transformer coupled bilateral converter similar to the converter of FIG. 8 but including basic chopper circuits at both ends of the transformer windings. Diodes 80, 81, 82, and 83 are provided to complete full-bridges on each side of the transformer and thus permit full wave rectification.

All of the bilateral conversion configurations described in connection with FIGS. 9 through 12 involve symmetrical circuit elements on both sides of the isolating transformer. Such symmetry is not required for the proper operation of the circuits as can be seen in connection with the circuit configurations of FIGS. 13 through 16.

Figure 13:
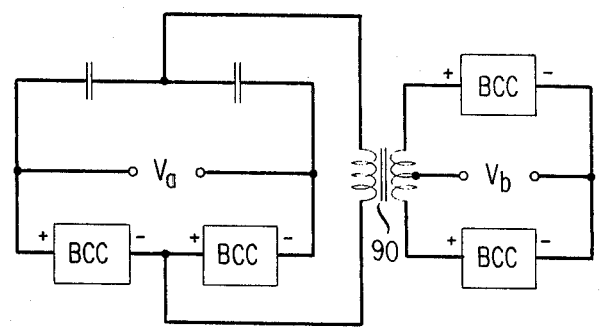
FIG. 13 is a block diagram of a bilateral converter having a half-bridge input circuit and a push-pull output circuit.
Figure 14:
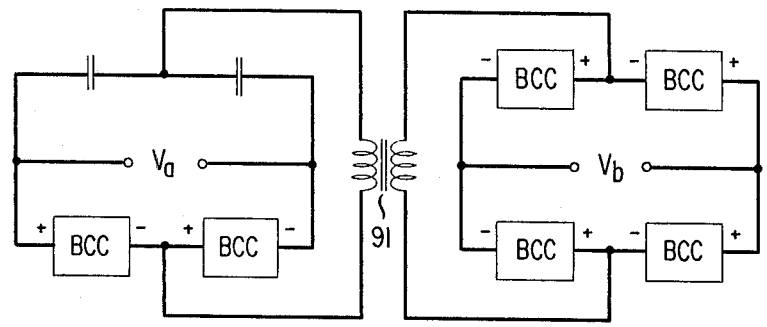
FIG. 14 is a block diagram of a bilateral converter having a half-bridge input current and a full-bridge output circuit.
Figure 15:
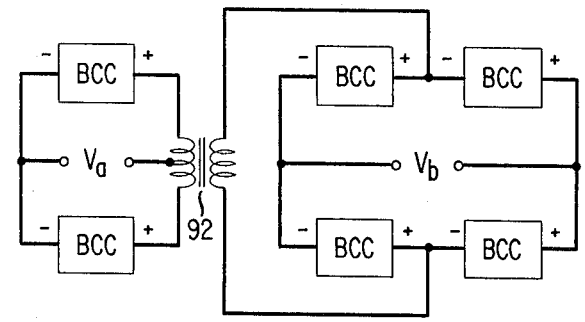
FIG. 15 is a block diagram of a bilateral converter having a push-pull input circuit and a full-bridge output circuit.
Figure 16:
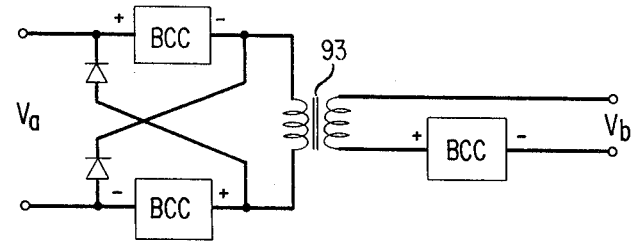
FIG. 16 is a block diagram of a bilateral converter having a double-ended input circuit and a single-ended output circuit.

FIG. 13, for example, shows a bilateral conversion circuit having a half-bridge chopper configuration on the left-hand side of transformer 90 and a push-pull configuration on the right-hand side of transformer 90. Similarly, FIG. 14 shows a bilateral converter having half-bridge configuration on the left-hand side of transformer 91 and a full-bridge configuration on the right-hand side of transformer 91. FIG. 15 shows a bilateral converter having a push-pull configuration on the left-hand side of transformer 92 and a full-bridge configuration on the right-hand side of the configuration. Finally, FIG. 16 shows a bilateral converter with a double-ended configuration on the left-hand side of the transformer 93 and a single-ended configuration on the right-hand side.

It will be apparent that many other combinations of the various configurations will be as equally suitable as bilateral converters. It will be necessary in each case to arrange the switching phase for the various transistors to afford appropriate current paths for each direction of current flow. These are obvious from inspection of the drawings and thus have been described in detail only in connection with FIGS. 1 and 2.

It will be noted that the basic chopper circuits of FIGS. 3 and 4 are merely one type of current switching arrangements which are polarity sensitive and which can be bridged by oppositely poled unidirectional conducting devices. Such circuit operation can also be obtained from configurations of silicon controlled rectifiers, motor and mechanical controls, and any other polarity sensitive switching arrangements. Such other configurations will be readily apparent to those skilled in the art from the above description and are believed to clearly fall within the spirit and scope of the present invention.

What is claimed is:

1. A bilateral direct current to direct current voltage level converter comprising:
    at least one inductive element for converting the voltage level of interrupted direct currents to a different voltage level by inductive action,
    a first transistor switch having its output terminal connected to said inductive element,
    a second transistor switch having its output terminal connected to said inductance element,
    a source of alternating driving signals connected to the input terminals of said first and second transistor switches,
    a unidirectional current conducting device connected across each of said first and second transistor switches and poled oppositely to the direction of easy conduction of the connected one of said transistor switches,
    means for connecting direct current loads requiring different voltage levels to said first and second transistor switches, and
    means for connecting direct current sources substantially of said different voltage levels to said first and second transistor switches.

2. The bilateral voltage level converter according to claim 1 wherein said inductive element forms one arm of a T-network, the other arms of which comprise said first and second transistor switches.

3. The bilateral voltage level converter according to claim 1 wherein said inductive element comprises a transformer.

4. The bilateral voltage level converter according to claim 3 further including third and fourth transistor switches connected to be driven in a push-pull relationship with respect to respective ones of said first and second transistor switches by opposite phases of said source of driving signals.

5. The bilateral voltage level converter according to claim 3 including a further plurality of transistor switches, each by-passed by a corresponding unidirectional conducting device, said transistor switches being connected in two symmetrical networks, one on each side of said transformer.

6. The bilateral voltage level converter according to claim 3 including a further plurality of transistor switches, each by-passed by a corresponding unidirectional conducting device, said transistor switches being connected in a full bridge circuit on at least one side of said transformer.

7. The bilateral voltage level converter according to claim 6 wherein at least one arm of one of said bridge circuits comprises a capacitor.

8. The bilateral voltage level converter according to claim 6 wherein at least one arm of one of said bridge circuits comprises a diode.

* * * * *